(12) United States Patent
Plondke et al.

(10) Patent No.: US 9,116,685 B2
(45) Date of Patent: Aug. 25, 2015

(54) TABLE CALL INSTRUCTION FOR FREQUENTLY CALLED FUNCTIONS

(75) Inventors: Erich James Plondke, Austin, TX (US); Lucian Codrescu, Austin, TX (US); Charles Joseph Tabony, Austin, TX (US); Ajay Anant Ingle, Austin, TX (US); Suresh K. Venkumahanti, Austin, TX (US); Evandro Carlos Menezes, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 995 days.

(21) Appl. No.: 13/185,644

(22) Filed: Jul. 19, 2011

(65) Prior Publication Data

US 2013/0024663 A1 Jan. 24, 2013

(51) Int. Cl.
*G06F 9/30* (2006.01)
*G06F 9/32* (2006.01)

(52) U.S. Cl.
CPC ........ *G06F 9/30054* (2013.01); *G06F 9/30167* (2013.01); *G06F 9/30181* (2013.01); *G06F 9/322* (2013.01); *G06F 9/327* (2013.01)

(58) Field of Classification Search
CPC combination set(s) only.
See application file for complete search history.

(56) References Cited

U.S. PATENT DOCUMENTS

| 3,475,732 | A | 10/1969 | Avsan et al. |
| 5,574,883 | A | 11/1996 | Freeman |
| 5,632,034 | A * | 5/1997 | O'Farrell ........................ 717/140 |
| 6,154,878 | A * | 11/2000 | Saboff ............................ 717/173 |
| 6,175,956 | B1 * | 1/2001 | Hicks et al. .................... 717/114 |
| 6,182,282 | B1 * | 1/2001 | Stoodley et al. ............... 717/116 |
| 6,446,259 | B2 * | 9/2002 | Brett ............................... 717/165 |
| 6,463,582 | B1 | 10/2002 | Lethin et al. |
| 6,779,101 | B1 | 8/2004 | Berg et al. |
| 7,069,549 | B2 * | 6/2006 | Charnell et al. ............... 717/158 |
| 7,886,287 | B1 * | 2/2011 | Davda ............................ 717/168 |
| 8,037,482 | B1 * | 10/2011 | Tene et al. ...................... 719/321 |
| 8,607,208 | B1 * | 12/2013 | Arnold et al. .................. 717/153 |
| 2001/0007124 | A1 * | 7/2001 | Iwamura et al. ............... 711/165 |
| 2002/0199083 | A1 | 12/2002 | Kao et al. |
| 2003/0023960 | A1 | 1/2003 | Khan et al. |
| 2003/0046449 | A1 * | 3/2003 | Gray-Donald et al. ........ 709/330 |
| 2003/0115584 | A1 * | 6/2003 | Fahs et al. ...................... 717/158 |
| 2004/0163077 | A1 * | 8/2004 | Dimpsey et al. ............... 717/130 |
| 2005/0204351 | A1 | 9/2005 | Jiang et al. |
| 2007/0157178 | A1 * | 7/2007 | Kogan et al. ................... 717/130 |
| 2009/0240931 | A1 | 9/2009 | Coon et al. |
| 2011/0107070 | A1 * | 5/2011 | Barbulescu et al. ........... 712/226 |

FOREIGN PATENT DOCUMENTS

| CN | 1973262 A | 5/2007 |
| EP | 1063587 A2 | 12/2000 |

(Continued)

OTHER PUBLICATIONS

International Search Report and Written Opinion—PCT/US2012/047488—ISA/EPO—Oct. 8, 2012.

*Primary Examiner* — Eric Coleman
(74) *Attorney, Agent, or Firm* — Peter Michael Kamarchik; Nicholas J. Pauley; Paul Holdaway

(57) ABSTRACT

An apparatus includes a memory that stores an instruction including an opcode and an operand. The operand specifies an immediate value or a register indicator of a register storing the immediate value. The immediate value is usable to identify a function call address. The function call address is selectable from a plurality of function call addresses.

23 Claims, 6 Drawing Sheets

(56) References Cited

FOREIGN PATENT DOCUMENTS

| | | |
|---|---|---|
| GB | 2412192 A | 9/2005 |
| JP | H04158445 A | 6/1992 |
| JP | 2006079451 A | 3/2006 |
| JP | 2009230756 A | 10/2009 |
| JP | 5165650 B2 | 3/2013 |
| JP | 5334083 B2 | 11/2013 |
| WO | 9608763 A2 | 3/1996 |

* cited by examiner

TABLE CALL INSTRUCTION FOR FREQUENTLY CALLED FUNCTIONS

I. FIELD

The present disclosure is generally related to a table call instruction for frequently called functions.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

As the computing capabilities of electronic devices such as wireless telephones increase, the number of functions used to implement the various applications may increase significantly. When applications are compiled and linked, a large portion of the output code may be function calls and may result in large overall code size.

III. SUMMARY

A table-based function call instruction that includes an opcode and an operand is disclosed. The operand may specify an immediate value, where the immediate value identifies the location of a function call address of a particular function. Alternately, the operand may specify a register indicator of a register, and the location of the function call address may be stored in the register instead of being encoded directly into the instruction. The function call address is selectable from a plurality of function call addresses stored in a table. The table of function call addresses may be generated and the table may be sorted based on how frequently the functions corresponding to the function call addresses included in the table are invoked. The table may be generated and sorted during link time or at compile time. When a length of the table call instruction is less than a length of a generic function call instruction, a reduction in code size may be achieved.

As an example, a 32-bit generic function call instruction may include an 8-bit opcode and a 24-bit address or address offset. During compilation (or linking) of an application, a compiler (or linker) may identify the 16 most frequently called functions of the application. A table including function call addresses of those 16 functions may be generated, and the table may be indexed using a 4-bit table index. The function call address of a function may be the address of the first instruction of the function (i.e., the address that is "jumped to" when the function is called). The generic function call instructions used to invoke the 16 most frequently called functions may be replaced with the table call instruction disclosed herein, and processing the table call instruction may load and jump to the appropriate function call address retrieved from the table. For example, the table call instruction may be an 8-bit instruction that includes a 4-bit opcode and a 4-bit operand. When the 4-bit operand is an immediate value, the 4-bit operand may represent an index to the 16-entry table of function call addresses. When the 4-bit operand is a register indicator, the 4-bit operand may specify one of 16 registers that stores an offset in the table. Thus, a savings of 24-bits may be achieved each time a generic 32-bit function call instruction is replaced with the 8-bit table call instruction. It should be noted that the number of function call addresses stored in the table may be less than or greater than 16. In some implementations, the table may be stored in a cache-based memory, and a special register (e.g., a register storing a global pointer) may be used to access the table.

In a particular embodiment, an apparatus includes a memory that stores an instruction. The instruction includes an opcode and an operand. The operand specifies an immediate value or a register indicator of a register storing the immediate value. The immediate value is usable to identify a function call address that is selectable from a plurality of function call addresses.

In another particular embodiment, a method includes processing an instruction at a processing element to produce an opcode and an operand. The opcode identifies a table function call instruction, and the operand identifies an immediate value or a register indicator of a register storing the immediate value. The immediate value is usable to identify a function call address that is selectable from a plurality of function call addresses. The method includes using the immediate value as an index into a table to identify the function call address.

In another particular embodiment, a non-transitory computer-readable medium includes program code that, when executed by a processor, causes the processor to produce an opcode and an operand from an instruction code. The opcode identifies a table function call instruction. The operand specifies an immediate value or a register indicator of a register storing the immediate value. The immediate value is usable to identify a function call address that is selectable from a plurality of function call address. The non-transitory computer-readable medium further includes program code that, when executed by the processor, causes the processor to use the immediate value as an index into a table to identify the function call address and to jump to the identified function call address.

In another particular embodiment, an apparatus includes means for storing an instruction and means for processing the instruction to produce an opcode and an operand. The operand specifies an immediate value or a register indicator of a register storing the immediate value. The immediate value is usable to identify a function call address that is selectable from a plurality of function call addresses and the means for processing jumps to the identified function call address.

One particular advantage provided by at least one of the disclosed embodiments is a reduction in overall code size. Embedded low cost applications may benefit from smaller code size. For example, modem software, software embedded in a wireless device, and other software processing environments may benefit from reduced code size. Thus, it may be advantageous to reduce code size for software that has many function calls. Another particular advantage is reduced memory usage and a reduction in power consumption in devices due to smaller code sizes.

Other aspects, advantages, and features of the present disclosure will become apparent after review of the entire appli-

IV. BRIEF DESCRIPTION OF THE DRAWINGS

V. DETAILED DESCRIPTION

A table call instruction may include an opcode and an operand that can be used as an index into a table. The operand may specify an immediate value or a register indicator of a register storing the immediate value, where the immediate value is usable to identify a function call address from the table. The table may store function call addresses of frequently called instructions, and processing the table call instruction may include loading and jumping to the function call address that is identified by the immediate value. When a combination of the opcode and the operand takes up fewer bits than a generic function call instruction, a savings in code size may be achieved.

Figure 1:
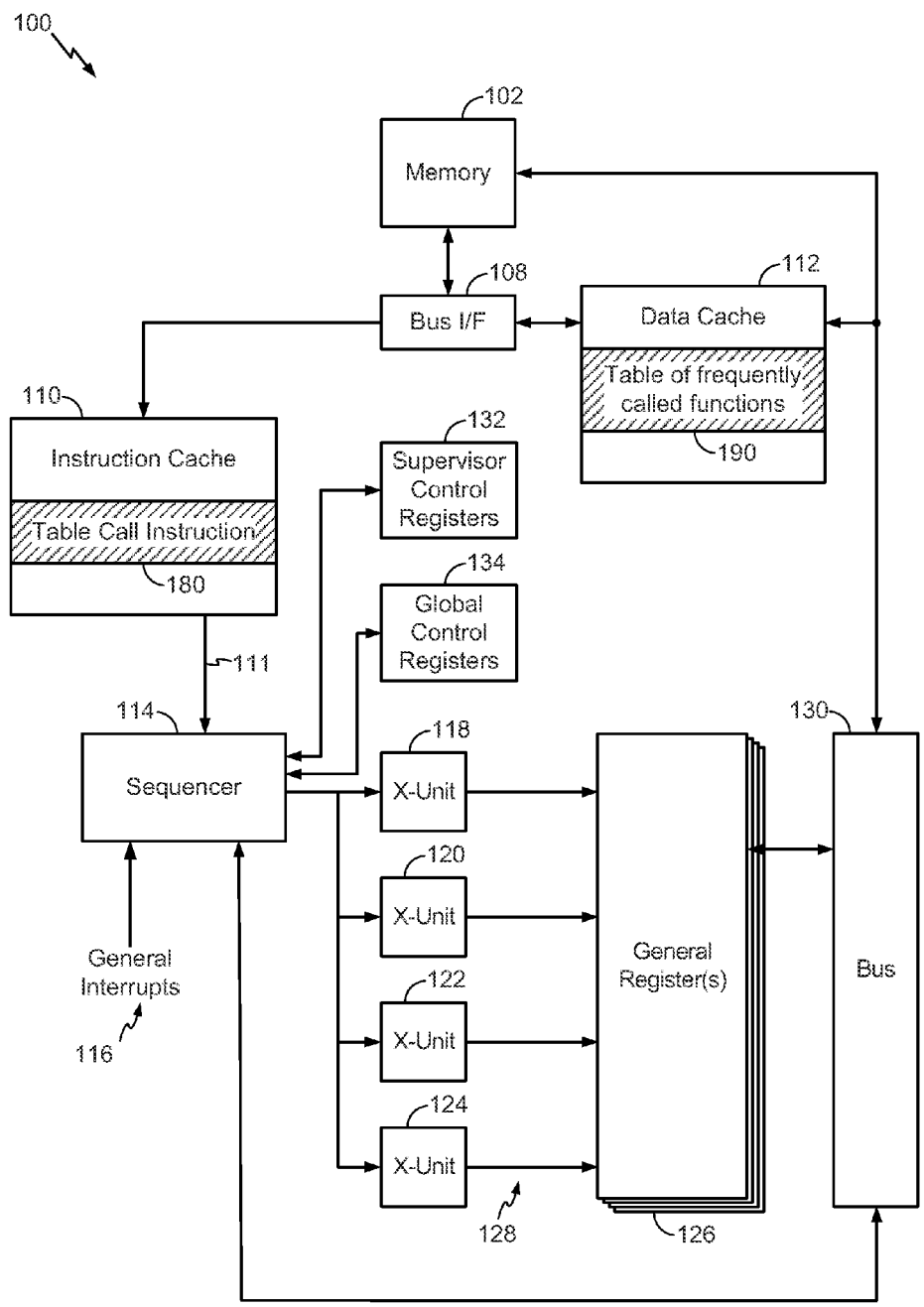
FIG. 1 is a block diagram of a particular illustrative embodiment of a system operable to store and process a table call instruction.

Referring to FIG. 1, a particular illustrative embodiment of a system operable to store and process a table call instruction 180 is disclosed and generally designated 100. The system 100 may include a memory 102 coupled to an instruction cache 110 via a bus interface 108. In a particular embodiment, all or a portion of the system 100 may be integrated into a processor.

The table call instruction 180 may include an opcode and an operand. In a particular embodiment, the operand specifies an immediate value (e.g., a numerical constant), as further illustrated in FIGS. 2-4. The immediate value may be used to identify a particular function having a function call address that is selectable from a plurality of function call addresses that are stored in a table (e.g., illustrative table 190). The function call address stored in the table may correspond to frequently called functions of an application. The immediate value may be an integer constant representing an index position of a function call address in the table. For example, a table call instruction for the third row of a table may be "TC #3," where 'TC' is the opcode and '#3' is the operand (i.e., the immediate value). Alternately, when the first row of a table is index 0 instead of index 1, the table call instruction for the third row may be "TC #2."

Alternately, the operand may specify a register indicator of a register storing the immediate value. For example, a table call instruction may be "TC r1," where the register r1 stores the immediate value of 3.

The memory 102 may transmit the table call instruction 180 to the instruction cache 110 via the bus interface 108. A data cache 112 may also be coupled to the memory 102 via the bus interface 108. The data cache 112 may include the table 190 of frequently called functions. The table 190 may be generated and sorted during link time or at compile time. In a particular illustrative embodiment, the table 190 includes addresses of the most frequently called functions at the top of the table (e.g., debug functions and restore functions) and the table 190 is sorted in descending order of frequency of use (e.g., as determined by a compiler or linker). The table call instruction 180 may be created with fewer bits than a generic function call instruction, a generic jump instruction, or a generic branch instruction, since the table call instruction 180 may point to the table 190 that includes the addresses of the functions to be called. The table call instruction 180 is distinct from a generic branch instruction and from a generic jump instruction of an instruction set. Less frequently called functions may be invoked using the generic branch or jump instructions, while more frequently called functions may be invoked using the table call instruction 180. In addition, the table 190 may be fixed or may be dynamically updated during execution of applications at the system 100.

The instruction cache 110 may be coupled to a sequencer 114 via a bus 111. The sequencer 114 may receive general interrupts 116, which may be retrieved from an interrupt register (not shown). In a particular embodiment, the instruction cache 110 may be coupled to the sequencer 114 via a plurality of current instruction registers (not shown), which may be coupled to the bus 111 and associated with particular threads (e.g., hardware threads) of the processor 100. In a particular embodiment, the processor 100 may be an interleaved multi-threaded processor including six (6) threads.

In a particular embodiment, the bus 111 may be a one-hundred and twenty-eight bit (128-bit) bus and the sequencer 114 may be configured to retrieve instructions from the memory 102 via instruction packets (e.g., a VLIW instruction packet including one or more table call instructions 180) having a length of thirty-two (32) bits each. The bus 111 may be coupled to a first instruction execution unit 118, a second instruction execution unit 120, a third instruction execution unit 122, and a fourth instruction execution unit 124. Each instruction execution unit 118, 120, 122, and 124 may be coupled to a general register file 126 via a first bus 128. The general register file 126 may also be coupled to the sequencer 114, the data cache 112, and the memory 102 via a second bus 130.

The system 100 may also include supervisor control registers 132 and global control registers 134 to store bits that may be accessed by control logic within the sequencer 114 to determine whether to accept interrupts (e.g., the general interrupts 116) and to control execution of instructions.

In a particular embodiment, any of the execution units 118, 120, 122, and 124 may execute the table call instruction 180 to produce the opcode and the operand. The opcode may indicate that the instruction being processed is a table call instruction and the operand may specify an immediate value or a register indicator storing the immediate value. The immediate value may be used as an index into the table 190 (e.g., to identify an address for a particular function to be called). In a particular embodiment, the size of the table call instruction 180 may be less than or equal to 24 bits, 16 bits, or 8 bits. Multiple table call instructions 180 may be included in a VLIW packet and may be executed in parallel by the execution units 118, 120, 122, and 124 during the same clock cycle.

The system 100 of FIG. 1 thus illustrates a table call instruction 180 that may be created with fewer bits than a generic function call, branch instruction, or jump instruction, leading to an overall reduction in code size and a reduction in power consumption due to the reduction in code size.

Figure 2:
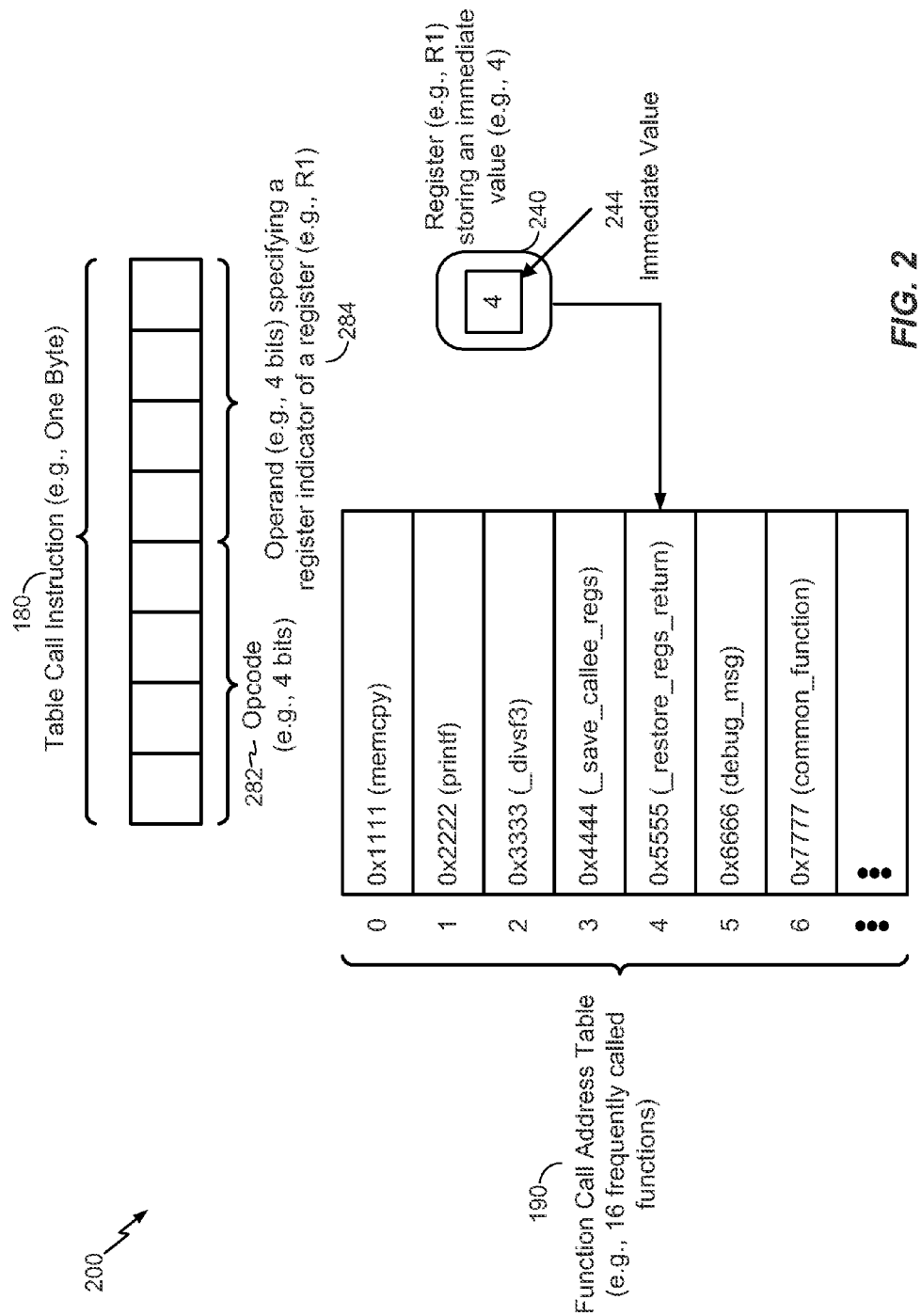
FIG. 2 is a first diagram that illustrates operation of the system of FIG. 1.
Figure 3:
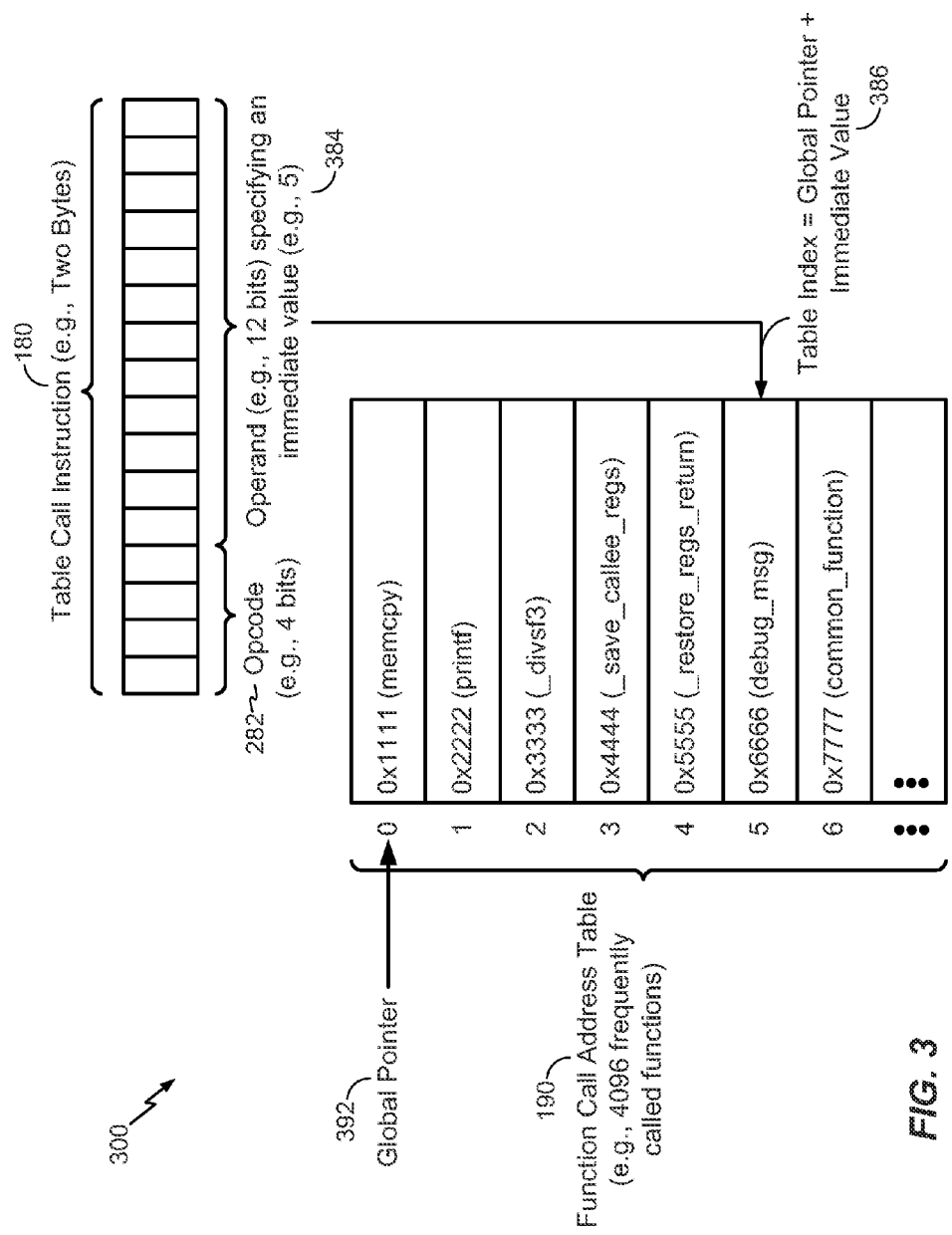
FIG. 3 is a second diagram that illustrates operation of the system of FIG. 1.
Figure 4:
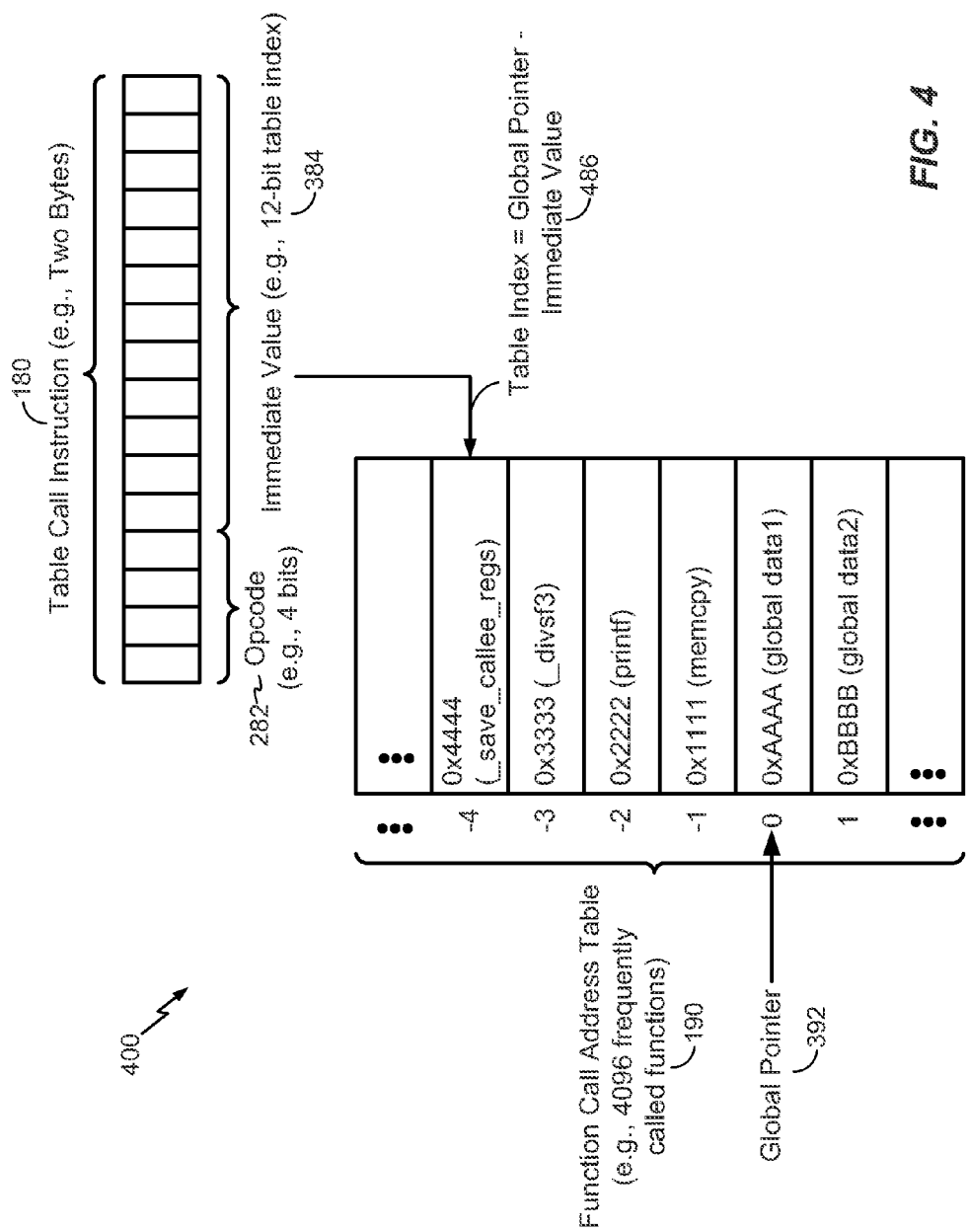
FIG. 4 is a third diagram that illustrates operation of the system of FIG. 1.

FIGS. 2-4 depict three examples of operation at the system 100 of FIG. 1. Referring to FIG. 2, a first illustrative example of operation at the system 100 of FIG. 1 is disclosed and generally designated 200.

During operation, a particular one of the execution units 118, 120, 122, or 124 of FIG. 1 may execute the table call instruction 180 to produce the opcode 282 and the operand 284 that specifies a register indicator of a register 240 (e.g., R1) storing an immediate value 244 (e.g., '4'). In the embodiment illustrated in FIG. 2, the table call instruction 180 is a one-byte instruction (i.e., 8 bits) with 4 bits representing the opcode 282 and 4 bits representing the operand 284 (i.e., a 4-bit register indicator). For example, the 4-bit operand may specify one of 16 (i.e., $2^4$) registers that may store the immediate value, where the immediate value represents an index to the 16-entry table 190 of function call addresses. Alternately, the 4-bit operand may directly specify the immediate value, as in FIGS. 3-4. Thus, the function call address table 190 including 16 (i.e., $2^4$) frequently called functions may be indexed using the 4-bit operand 284. In a particular embodiment, the function call addresses may be stored in descending order, with index 0 corresponding to the most frequently called function (e.g., "memcpy" in FIG. 2, having a function call address of 0x1111).

The table 190 may be created during link time or at compile time. In a particular embodiment, the table 190 may be dynamically updated during execution of applications. For example, any one of the execution units 118-124 may dynamically update the table 190. In another particular embodiment, the table 190 may be fixed. After producing the immediate value 244 (e.g., '4') from the operand 284 (e.g., after a register access), a function call address (e.g., 0x5555) may be identified based on the immediate value of '4.' The particular execution unit 118-124 of FIG. 1 may jump to the identified function call address. For example, jumping to the function call address 0x5555 may include fetching or pre-fetching one or more instructions of the "_restore_regs_return" function (e.g., starting at the address 0x5555) into the instruction cache 110 of FIG. 1. In a particular embodiment, jumping to the function call address occurs during the processing of the table call instruction 180.

It will thus be appreciated that the more commonly used a function is, the greater the code savings when the function is called using the table call instruction 180. For example, a generic call to the "_restore_regs_return" function may include at least 32 bits, including 8 opcode bits and 24 bits to represent the hexadecimal address 0x5555 (i.e., the address of the_restore_regs_return function). By replacing the generic call with the table call instruction 180, a savings of 24 bits per call may be achieved.

Referring to FIG. 3, a second illustrative example of operation at the system 100 of FIG. 1 is disclosed and generally designated 300. During operation, a particular one of the execution units 118, 120, 122, or 124 of FIG. 1 may execute the table call instruction 180 to produce the opcode 282 and an operand 384 that specifies an immediate value (e.g., '5'). In the embodiment illustrated in FIG. 3, the table call instruction 180 is a two-byte instruction (i.e., 16 bits) with 4 bits representing the opcode 282 and 12 bits representing the operand 384 (i.e., a 12-bit table index) that specifies the immediate value. Thus, the table 190 may include 4096 (i.e., $2^{12}$) frequently called functions and may be indexed using the 12-bit immediate value 384. For example, as illustrated in FIG. 3, the 4096 frequently called functions may be stored in descending order, with index 0 corresponding to the most frequently called function (e.g., "memcpy" in FIG. 3, having a function call address of 0x1111).

FIG. 3 illustrates an embodiment in which the table 190 is accessed using a global pointer 392. For example, the table 190 may be stored in a global offset table that is stored within a global data section of a memory. The global offset table may support position independent code execution. The global pointer 392 may point to the first element of the table 190, as illustrated in FIG. 3. The immediate value specified by the operand 384 may be used as an offset from the global pointer 392. For example, the immediate value may be '5' and a table index 386 may be identified by adding '5' to the global pointer 392, resulting in a retrieval of function call address 0x6666 (e.g., corresponding to a "debug_msg" function) from the table 190. The global pointer 392 may identify a location in a global data section of the memory 102 that corresponds to the top of the table 190. Further, the table 190 may be a selectable function call table within a global offset table stored in memory 102 and the immediate value may be associated with a table index of the selectable function call table. The global offset table may support position independent code execution (i.e., code built where the address of symbols is not known at link time, such as for shared libraries).

As shown in FIG. 3, a particular table index 386 may be calculated by using the immediate value (e.g., 5) as an offset (e.g., a positive offset from the global pointer 392) with respect to the index represented by the global pointer 392 (e.g., 0). To illustrate, the table index 386 may be the immediate value plus the global pointer 392, as shown in FIG. 3. The particular execution unit 118-124 of FIG. 1 may jump to the identified function call address. For example, jumping to the function call address 0x6666 may include fetching or pre-fetching one or more instructions of the "debug_msg" function (e.g., starting at the address 0x6666) into the instruction cache 110 of FIG. 1. In a particular embodiment, jumping to the function call address occurs during the processing of the table call instruction 180.

Referring to FIG. 4, a third example of operation at the system 100 of FIG. 1 is disclosed and generally designated 400. In contrast with the embodiment illustrated in FIG. 3, the embodiment illustrated in FIG. 4 depicts the global pointer 392 pointing to a location in memory that is adjacent to, but does not include, the table 190.

The global pointer 392 may identify (i.e., point to) a global data section of the memory 102 that is unrelated to the table 190. For example, the global pointer may point to an index position 0 that is unrelated to the table 190 and that stores an address (e.g., address 0xAAAA) of a global data (e.g., "global data1"). As shown in FIG. 4, a particular table index 486 may be calculated by using the immediate value (e.g., 4) as an offset (e.g., a negative offset) from the global pointer 392. In such an embodiment, the immediate value may be subtracted from the global pointer 392 value to find a location for the particular function call address.

To illustrate, the immediate value may be '4,' and a function call address 0x2222 (e.g., corresponding to a "_save_callee_regs" function) may be identified by subtracting the immediate value (i.e., '4') from the global pointer 392 value. The particular execution unit 118-124 of FIG. 1 processing the table call instruction 180 may then jump to the identified function call address. For example, jumping to the function call address 0x4444 may include fetching or pre-fetching instructions of the "_save_callee_regs" function (e.g., starting at the address 0x4444) into the instruction cache 110 of FIG. 1.

FIGS. 2-4 thus depict various examples of processing table call instructions. When the size of the table call instruction is less than a number of bits to identify a difference between an address of the table call instruction (e.g., an address of an instruction that calls the table 190 that may be stored in a current instruction pointer) and a function call address for the identified function, denser or smaller code size may be achieved. To illustrate, if the table call instruction and the address of the identified function are separated by more than 2 megabytes (i.e., the distance cannot be represented in 24 bits or less), then the table call instruction may lead to denser code if the table call instruction is 24 bits or less in size. With respect to multi-word instructions, the size of the table call instruction may be less than a difference between an address of the portion of the multi-word instruction that performs the function call and the address of the called function. Thus, the combined length of the opcode and the immediate value may be shorter than a generic function call instruction, leading to improved performance of an instruction cache, a savings in bandwidth used for calling functions, and reduced power consumption in devices.

Figure 5:
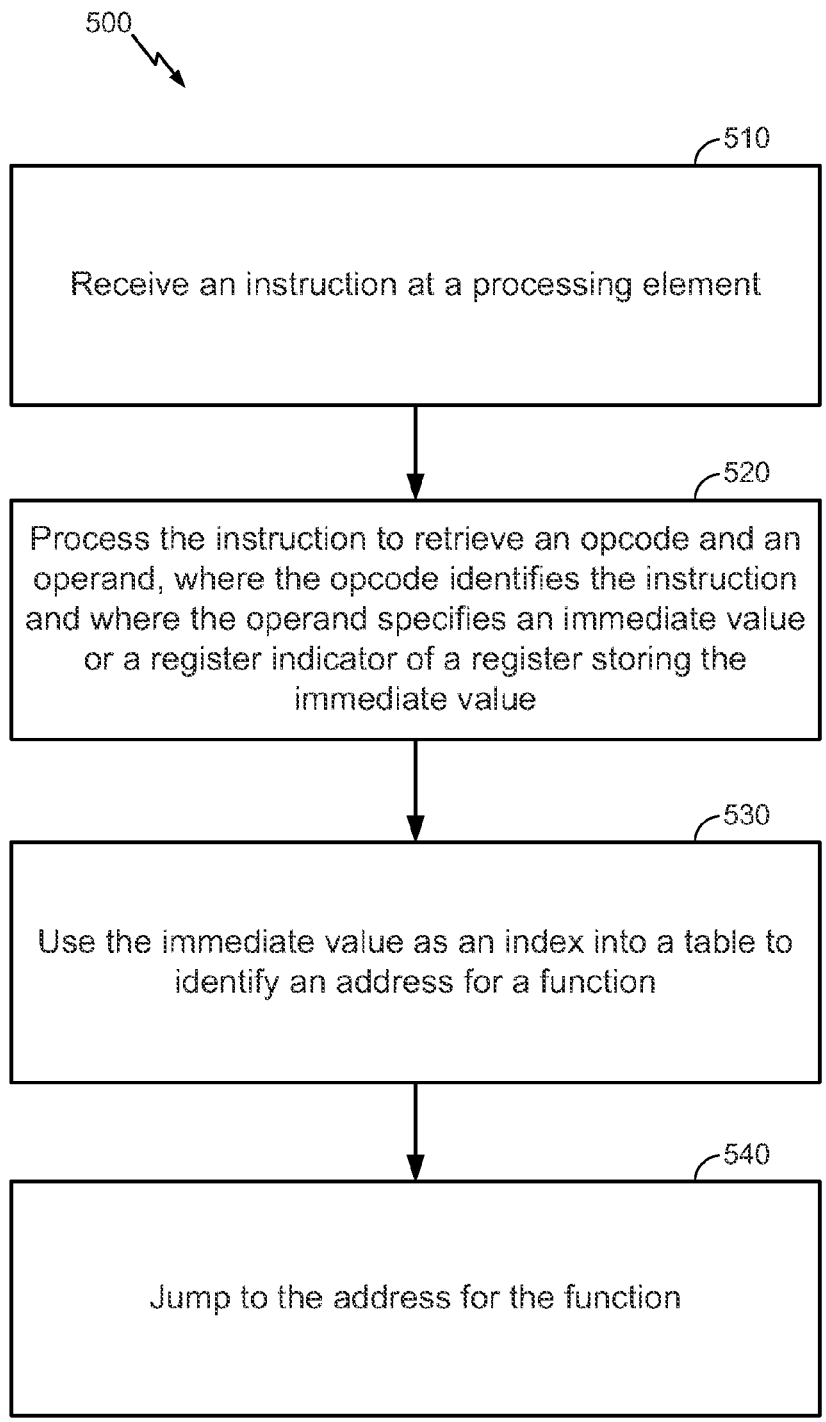
FIG. 5 is a flow chart of a particular illustrative embodiment of a method of processing a table call instruction.

Referring to FIG. 5, a flow chart of a particular illustrative embodiment of a method of processing an instruction to produce an opcode and an operand is depicted and generally designated 500. In an illustrative embodiment, the method 500 may be performed at the system 100 of FIG. 1 and may be illustrated with reference to FIGS. 2-4.

The method 500 may include receiving an instruction at a processing element, at 510. For example, in FIG. 1, the table call instruction 180 may be received at the one of the execution units 118-124. The method 500 may also include processing the instruction to produce an opcode and an operand that specifies an immediate value or a register indicator storing the immediate value, at 520. For example, in FIG. 1, the table call instruction 180 may be processed by one of the execution units 118-124 to produce an opcode and an operand (e.g., during an instruction decode stage). In an illustrative embodiment, the opcode may be the 4-bit opcode 282 of FIGS. 2-4 and the operand may be the 4-bit operand 284 of FIG. 2 or the 12-bit operand 384 of FIGS. 3-4.

The method 500 may further include using the immediate value as an index into a table to identify an address for a function, at 530. The table may store addresses for frequently called functions. For example, in FIG. 1, an address may be retrieved from the table 190 of frequently called functions by using the immediate value of the table call instruction 180 as a table index. In a particular embodiment, the immediate value may be a direct index into the table 190, as illustrated in FIG. 2. Alternately, the index may be calculated by using the immediate value as an offset with respect to a global pointer, as illustrated in FIGS. 3-4. The method 500 may also include jumping to the address for the function, at 540. The function may then be executed as if the function had been called using a generic function call instruction.

Figure 6:
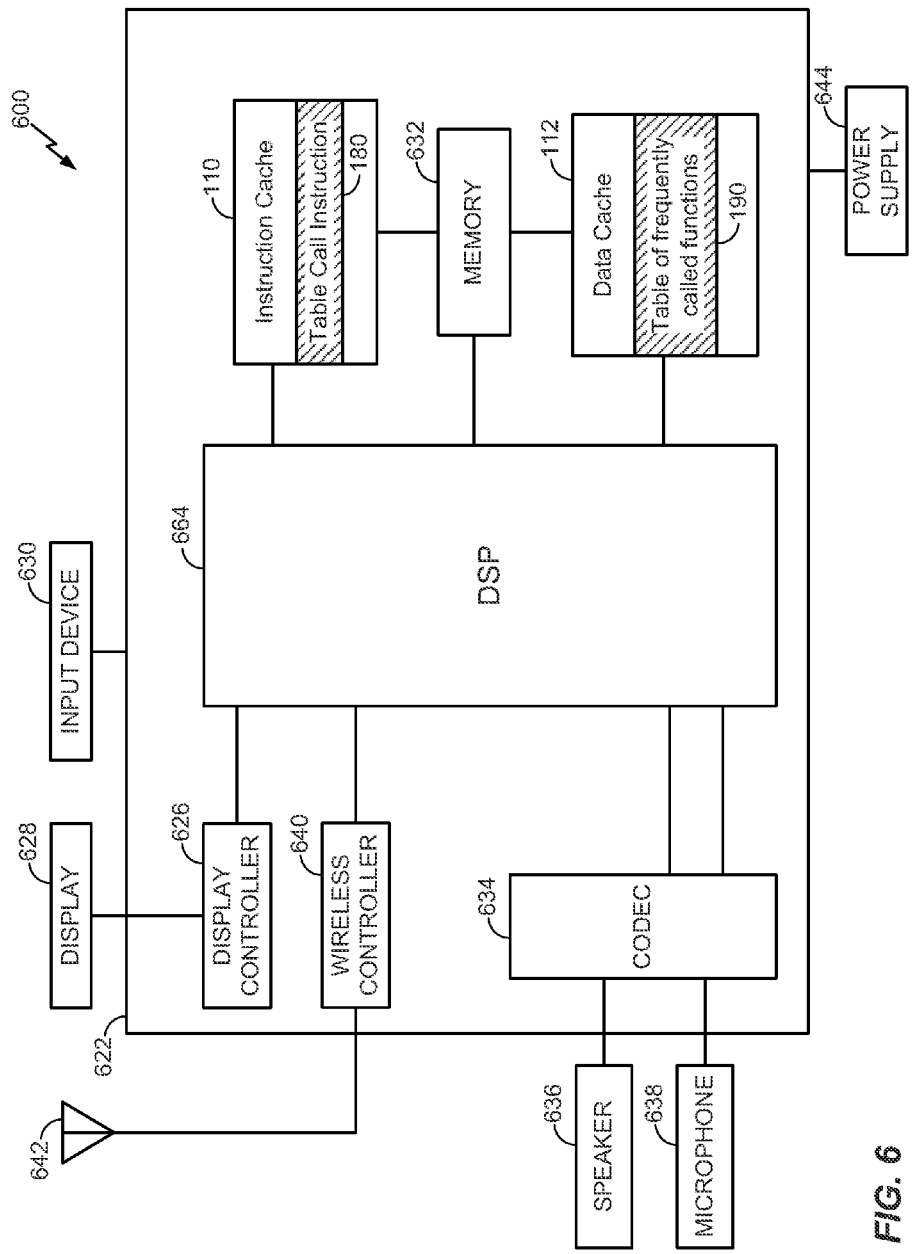
FIG. 6 is a block diagram of a wireless device including a processor that is operable to execute a table call instruction.

Referring to FIG. 6, a block diagram of a particular illustrative embodiment of a wireless device that includes a memory storing an instruction including an opcode and an operand is depicted and generally designated 600. The device 600 includes a processor, such as a digital signal processor (DSP) 664, coupled to a memory 632. An instruction cache (e.g., illustrative instruction cache 110) and a data cache (e.g., illustrative data cache 112) may also be coupled to the memory 632 and to the DSP 664. In a particular embodiment, the memory 632 stores and transmits instructions executable by the DSP 664, such as the table call instruction 180, to the instruction cache 110. When processed, the table call instruction 180 may produce an operand (e.g., an immediate value) that is used as an index to retrieve a particular function call address from the table 190 of frequently called functions stored in the data cache 112. Upon retrieving the particular function call address, the DSP 664 or a component thereof may jump to the particular function call address (e.g., to begin executing a corresponding function).

FIG. 6 also shows a display controller 626 that is coupled to the DSP 664 and to a display 628. A coder/decoder (CODEC) 634 can also be coupled to the DSP 664. A speaker 636 and a microphone 638 can be coupled to the CODEC 634. FIG. 6 also indicates that a wireless controller 640 can be coupled to the DSP 664 and to a wireless antenna 642. In a particular embodiment, the DSP 664, the display controller 626, the memory 632, the CODEC 634, and the wireless controller 640 are included in a system-in-package or system-on-chip device 622.

In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

It should be noted that although FIG. 6 depicts a wireless communications device, the DSP 664 and the memory 632 may also be integrated into a set-top box, a music player, a video player, an entertainment unit, a navigation device, a personal digital assistant (PDA), a fixed location data unit, or a computer. A processor (e.g., including the execution units 118, 120, 122, and 124 of FIG. 1) may also be integrated into such a device.

In conjunction with the described embodiments, an apparatus is disclosed that includes means for storing an instruction including an opcode and operand. For example, the means for storing may be the memory 102 of FIG. 1, the memory 632 of FIG. 6, the instruction cache 110 of FIG. 1 and FIG. 6, one or more other devices configured to store an instruction, or any combination thereof.

The apparatus may also include means for processing the instruction to produce an opcode and an operand. The operand may specify an immediate value or a register indicator of a register storing the immediate value. For example, the means for processing may include one or more of the execution units 118, 120, 122, and 124 of FIG. 1, the DSP 664 of FIG. 6, one or more devices configured to process an instruction, or any combination thereof.

The apparatus may further include means for storing a plurality of function call addresses in a table. For example, the means for storing may be the memory 102 of FIG. 1, the memory 632 of FIG. 6, the data cache 112 of FIG. 1 and FIG. 6, one or more other devices configured to store a plurality of function call addresses in a table, or any combination thereof.

The apparatus may further include means for dynamically updating the table. For example, the means for dynamically updating may be the execution units 118-124 of FIG. 1, one or more other devices configured to dynamically update a function address table, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   a processor; and
   a memory that stores an instruction of an application, the instruction including an opcode and an operand,
   wherein the operand specifies:
      an immediate value; or
      a register indicator of a register storing the immediate value,
   wherein the immediate value identifies a function call address that is selectable from a table that includes a plurality of function call addresses corresponding to a set of functions of the application, the set of functions including frequently used functions of the application as determined by a compiler or by a linker, the table excluding a function call address of a function of the application that is less frequently used than any of the frequently used functions, and
   wherein the processor is configured to dynamically update the table.

2. The apparatus of claim 1, wherein the frequently used functions are more frequently used than at least one other function of the application, and wherein the processor is further configured to dynamically update the table during execution of the application.

3. The apparatus of claim 1, wherein the memory further stores a branch instruction and a jump instruction, the branch instruction and the jump instruction corresponding to functions not indicated by the table.

4. The apparatus of claim 1, wherein each of the plurality of function call addresses is associated with a corresponding executable function of the set of functions.

5. The apparatus of claim 1, wherein the processor is further configured to access the function call address by fetching one or more instructions of a function associated with the function call address into a cache.

6. The apparatus of claim 1, wherein the table is sorted by the compiler or by the linker based on frequency of usage of functions in the application, and wherein the processor is further configured to dynamically load the table.

7. The apparatus of claim 1, wherein the table is stored in the memory or in a cache.

8. The apparatus of claim 1, wherein a location of the table is determined relative to a global pointer.

9. The apparatus of claim 8, wherein the global pointer identifies a first function call address of the plurality of function call addresses and wherein the first function call address is identified by adding the immediate value to the global pointer.

10. The apparatus of claim 8, wherein the global pointer identifies a global data section within the memory, and wherein a first function call address is identified by subtracting the immediate value from the global pointer.

11. The apparatus of claim 1, wherein a size of the instruction is less than a number of bits required to identify a difference between an address of the instruction and the function call address.

12. The apparatus of claim 11, wherein the size of the instruction is less than or equal to 24 bits, 16 bits, or 8 bits.

13. The apparatus of claim 1, wherein the memory stores the table within a global offset table and wherein the immediate value is associated with a table index of the table.

14. The apparatus of claim 13, wherein the global offset table supports position independent code execution.

15. The apparatus of claim 1, further comprising a device selected from a group consisting of a set-top box, a music player, a video player, an entertainment unit, a navigation device, a communications device, a personal digital assistant (PDA), a fixed location data unit, and a computer, into which the memory is integrated.

16. A method comprising:
   processing an instruction of an application at a processing element to produce an opcode and an operand, wherein the opcode identifies a table function call instruction, and wherein the operand specifies:
      an immediate value; or
      a register indicator of a register storing the immediate value,
      wherein the immediate value identifies a function call address that is selectable from a table that includes a plurality of function call addresses corresponding to a set of functions of the application, the set of functions including frequently used functions of the application as determined by a compiler or a linker, the table excluding a function call address of a function of the application that is less frequently used than any of the frequently used functions;
   using the immediate value as an index into the table to identify the function call address; and
   dynamically updating the table.

17. The method of claim 16, wherein each function call address in the table corresponds to a distinct function, and wherein the table is dynamically updated during execution of the application.

18. The method of claim 16, further comprising jumping to the function call address.

19. The method of claim 18, wherein the jumping occurs during the processing of the instruction.

20. A non-transitory computer-readable medium including program code that, when executed by a processor, causes the processor to:
    produce an opcode and an operand from an instruction code of an application, wherein the opcode identifies a table function call instruction, and
    wherein the operand specifies:
        an immediate value; or
        a register indicator of a register storing the immediate value,
        wherein the immediate value identifies a function call address that is selectable from a table that includes a plurality of function call addresses corresponding to a set of functions of the application, the set of functions including frequently used functions of the application as determined by a compiler or by a linker, the table excluding a function call address of a function of the application that is less frequently used than any of the frequently used functions;
    use the immediate value as an index into the table to identify the function call address;
    jump to the function call address; and
    dynamically update the table.

21. The non-transitory computer-readable medium of claim 20, wherein the jump occurs during the processing of the instruction code, and wherein the table is dynamically updated during execution of the application.

22. An apparatus comprising:
    means for storing an instruction of an application;
    means for processing, wherein the means for processing processes the instruction to produce an opcode and an operand; and
    means for dynamically updating a table,
    wherein the operand specifies:
        an immediate value; or
        a register indicator of a register storing the immediate value,
    wherein the immediate value identifies a function call address that is selectable from the table,
    wherein the table includes a plurality of function call addresses corresponding to a set of functions of the application, the set of functions including frequently used functions of the application as determined by a compiler or by a linker, the table excluding a function call address of a function of the application that is less frequently used than any of the frequently used functions, and
    wherein the means for processing jumps to the function call address.

23. The apparatus of claim 22, further comprising means for storing the plurality of function call addresses in the table, wherein the means for dynamically updating the table is configured to dynamically update the table during execution of the application.

* * * * *